Dec. 23, 1941.    G. P. DESPRET    2,267,554
APPARATUS FOR MAKING GLASS TUBES
Filed Nov. 17, 1939
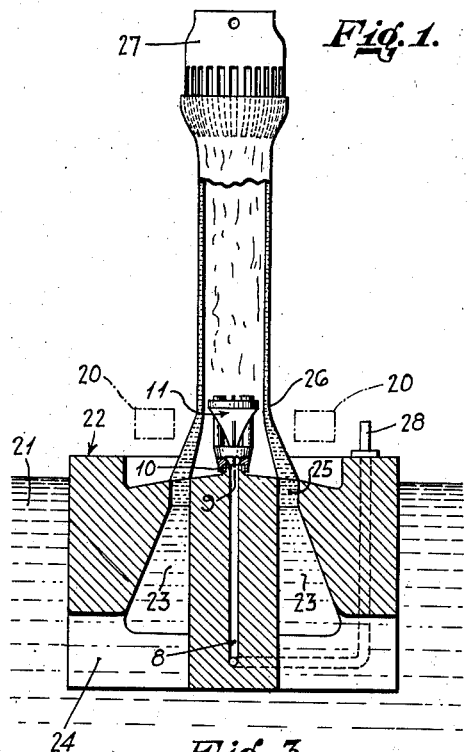
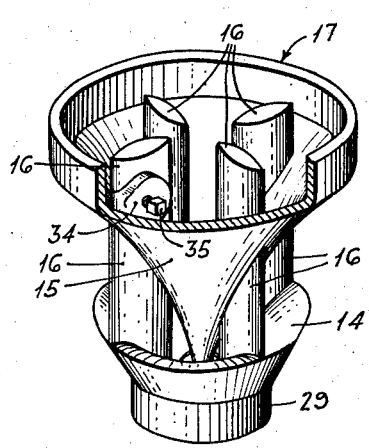
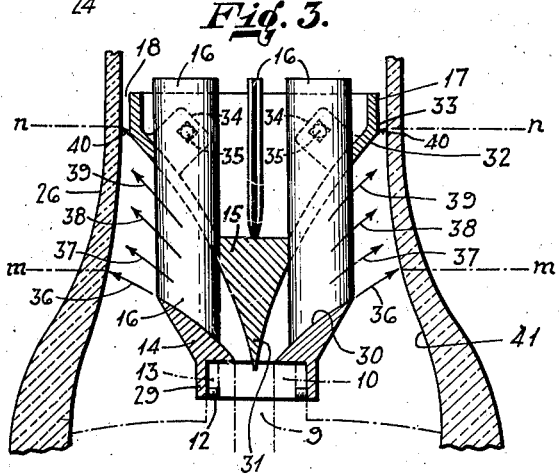
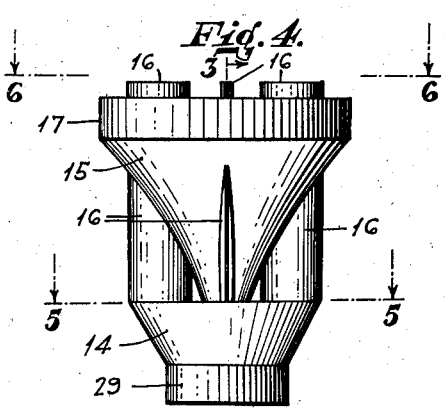
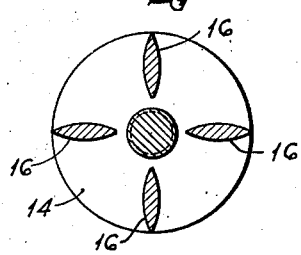
INVENTOR.
GEORGES PAUL DESPRET
BY
Richards & Geier
ATTORNEYS

Patented Dec. 23, 1941

2,267,554

UNITED STATES PATENT OFFICE

2,267,554

APPARATUS FOR MAKING GLASS TUBES

Georges Paul Despret, Paris, France, assignor to Compagnies Reunies des Glaces et Verres Speciaux du Nord de la France, Nord, France, a corporation of France Application November 17, 1939, Serial No. 304,908
In France November 19, 1938

4 Claims. (Cl. 49—17.1)

This invention refers to an apparatus for making tubes of glass or the like, and it relates more particularly to an apparatus for continuously drawing glass tubes.

The continuous process of making glass tubes is carried out by means of a forming apparatus which is situated over a molten glass mass. The forming apparatus comprises an annular orifice through which the glass mass can penetrate. The edges of the glass mass extending through this orifice are engaged by the outer side surfaces of a drawing piston or the like, which is then pulled upwardly away from the forming apparatus. The glass mass, the upper edges of which are held by the drawing piston, is thus pulled by the piston through the orifice and extends between the piston and the orifice in the form of a tubular mass. At the same time, air or other gas is blown under pressure into the interior of this tubular mass before it solidifies to prevent the narrowing of the tubular glass mass. Various devices may be used for continuing the drawing of the tubular glass mass as soon as it is solidified.

An object of the present invention is to improve gas-blowing devices used in the course of the described process for the purpose of facilitating the formation of glass tubes of any desired diameter.

Another object is the provision of a gas-blowing device by means of which it is possible to manufacture glass tubes of an exactly cylindrical shape.

A further object is the provision of a device through the use of which gas can continually circulate through the interior of a tubular glass mass in the course of its drawing, its solidification, and the cutting of the solidified glass into tubes of required length.

A still further object is the provision of a gas-blowing device through the use of which proper formation of a glass tube of desired size and shape is assured.

Other objects of the present invention will become apparent in the course of the following specification.

The objects of the present invention may be realized through the provision of a gas-blowing device which is centrally mounted in relation to the annular drawing orifice of the glass-drawing device. The gas-blowing device is provided with a current-dividing element having the form of an inverted cone or the like which is carried by vertical supports, so that the gas introduced into the device is blown against the base of the tubular mass and its side surfaces in the form of a number of radial outwardly directed currents. The distance of the inverted cone from the opening through which the gas is introduced is made adjustable, so that the amount of gas blown into the interior of the tubular mass may be conveniently varied. The proper circulation of the gas is assured by spacing the inverted cone from the side surfaces of the tubular mass and thereby providing an annular cylindrical opening through which the gas can always escape. The outer surfaces of the inverted cone and the corresponding surfaces of a member enclosing the opening through which the gas is introduced, are so shaped that the upper portions of each of the gas currents strike the inner surfaces of the tubular glass mass at a more acute angle than that at which the lower portions of each current strike the tubular mass. This makes it possible for the diverging gas currents to continue their flow along the side surfaces of the tubular glass mass and cool it to the desired extent.

The direction of the gas currents causes a very rapid increase in the viscosity of the glass mass, the inner surfaces of the tubular mass solidify very quickly, and the detrimental effect of the temperature variations and gas pressure upon the mass are considerably diminished.

The invention will appear more clearly from the following detailed description when taken in connection with the accompanying drawing showing by way of example a preferred embodiment of the inventive idea.

In the drawing:

Figure 1 is a vertical section through a glass-drawing device, some parts being shown in side elevation;

Figure 2 is a perspective view on a larger scale, of a gas-blowing device with some parts broken off;

Figure 3 is a vertical section along the line 3—3 of Figure 4;

Figure 4 shows the gas-blowing device in side elevation;

Figure 5 is a horizontal section along the line 5—5 of Figure 4; and

Figure 6 is a top view of the gas-blowing device along the line 6—6 of Figure 4.

Figure 1 shows a bath 21 of molten glass and a glass-drawing device 22 situated within the glass mass 21 and supported therein by any suitable means not shown in the drawing. The glass-drawing device 22 is provided with channels 23 which are in communication with a passage 24 and are filled with the liquid glass mass. The channels 23 terminate in the form of an annular orifice 25 through which the glass mass is drawn. This drawn glass having the form of a tubular body or mass 26 is attached by its upper edges to a drawing piston 27, which may be raised upwardly away from the orifice 25 by any suitable mechanism not shown in the drawing.

Air or any other suitable gas is supplied from the pipe 28 into a passage 8 terminating in an opening 9 which is situated centrally in relation to the orifice 25 and which is enclosed by a central upright flange 10 constituting a part of the glass-drawing device 22.

The gas-blowing device 11 comprises a cylindrical flange 29 which is mounted over the flange 10 and is attached thereto by pins 12 carried by the flange 29 and fitting into recesses 13 provided in the flange 10.

The flange 29 is integral with a funnel-shaped member 14 having substantially conical inner surfaces 30.

A body 15 having substantially the form of an inverted cone comprises an apex 31 which is situated within the opening 9. The member 15 is provided with outer surfaces 32 and a base 33 which is integral with a cylindrical flange 17. The flange 17 is situated at a distance from the inner walls of the tubular mass 26, so that a cylindrical space 18 is provided between the inner surfaces of the mass 26 and the outer surfaces of the flange 17.

Several vertical elongated rib-like supports 16 are placed around the opening 9 and their lower ends are firmly attached to the member 14. The supports 16 extend through suitable openings provided in the cone-like member 15. The member 15 comprises a plurality of ears 34 carrying bolts 35 which press against the supports 16 and thereby hold the cone-like member 15 in place. The position of the cone-like member 15 in relation to the funnel-like member 14 may be conveniently adjusted by unscrewing the bolts 35, moving the member 15 to the desired new position and then screwing the bolts 35 on again.

The surfaces 30 of the member 14 and the surfaces 32 of the member 15 are somewhat curved. The surfaces 32 form a more acute angle with the vertical axis of the opening 9 than the surfaces 30.

The operation of the device is as follows:

The drawing piston 27 is first dipped into the annular orifice 25, and when the piston 27 is raised away from said orifice, the melted glass adhering to said piston, while cooling, becomes solid, is securely attached to said piston and pulls the glass mass along with it, so that the glass mass extends between the orifice 25 and the piston 27 in the form of a tube 26, as shown in Figure 1. Simultaneously, air or some other gas under pressure is introduced through the pipe 28 into the passages 8, and flows to the opening 9. The position of the member 15 relatively to the opening 9 has been adjusted prior to the drawing operation to cause the desired amount of air to flow through the opening 9. The air is divided by the member 15 and the supports 16 into several radial upwardly flowing currents passing through the spaces between the members 14 and 15. The directions of flow of each current are indicated by the arrows 36 to 40 in Figure 3. It is apparent that due to the difference in inclination of the surfaces 30 and 32, the directions of the air currents vary, namely, the lower portion of each current will flow in the direction of the arrow 36, following the inclination of the surface 30, while the upper portion of each current will flow in the direction of the arrow 40, following the inclination of the surface 32. Since the surface 32 forms a more acute angle with the inner surfaces 41 of the tubular mass 26 than the surface 30, the flow of the upper portion of each air current, as represented by the arrow 40, will be also at a more acute angle in relation to the vertical axis of the tube 26 than the flow of the lower portion of the air current, as represented by the arrow 36. The intermediate portions of each current flow along directions indicated by the arrows 37, 38 and 39, the angles of inclination of which have different intermediate values. The body of air, constituted by the various air currents, is similar to a brush having a plurality of bristles extending in different directions.

It was found that the lower portion of each current, the direction of flow of which is represented by the arrow 36, may flow at an angle of 60°, while the upper portion of each current, the direction of which is represented by the arrow 40, may flow at an angle of 40°. The air currents strike an annular part of the inner surfaces 41 of the tubular glass mass 26 which is represented in Figure 3 as being limited by the lines $m-m$ and $n-n$. Obviously, the extent and the position of this part, the angles of inclination of the air currents, represented by the arrows 36 to 40, as well as the dimensions of the space 18 may be varied at will, depending upon the properties of glass or other material used for the drawing process and the diameter of the tube which is to be made of that material.

The air flowing upwardly along the inner surfaces of the tubular mass 26 will pass through the cylindrical space 18 between the flange 17 and the mass 26, and will escape at the upper orifice of the tubular mass 26. The viscosity of the portion $m-n$ of the glass mass 26 and of the portion situated adjacent the space 18 is increased by the contact of the entire air with the inner surfaces of the tubular mass 26.

The thickness of the tubular mass 26 is determined by the speed of the drawing and by the use of the usual cooling means 20, which cool the outer surfaces of the tubular mass 26 and which are indicated diagrammatically in Figure 1.

It is apparent that the specific illustrations shown above have been given by way of illustration and not by way of limitation, and that the structures above described are subject to wide variation and modification without departing from the scope or intent of the invention. For example, the present invention includes each and every device comprising the elements set forth in any of the appended claims and used to direct the flow of a gas in the described manner against the inner walls of a glass mass drawn in the form of a tube out of a container into which molten glass is introduced. Any suitable means may be used for attaching the member 14 to the flange 10. The flange 17 may be eliminated and then the passage 18 will have the form of a narrow ring. The surfaces 30 and 32 need not be curved. All of such and other variations and modifications are to be included within the scope of the present invention.

What is claimed is:

1. In an apparatus for making glass tubes by the drawing of a vitreous mass through an annular orifice, a device for blowing gas into the interior of the drawn tubular vitreous mass, said device comprising a member having an opening formed therein for introducing the gas into the interior of said tubular mass, said member including means for separating said gas into a plurality of radial outwardly directed currents and means for guiding a lower portion of each of said currents in a direction toward the inner surfaces of the tubular mass; a body situated close to said opening and including means for guiding an upper portion of each of said currents toward the inner surfaces of the tubular mass at a more acute angle than that at which said lower portion is guided and means constituting a cylindrical surface adjacent to the last-mentioned means; and means for varying the relative positions of said member and said body to vary the size of said opening.

2. In an apparatus for making glass tubes by the upward drawing of a vitreous mass through an annular orifice, a device for blowing gas into the interior of the drawn vertically directed tubular vitreous mass, said device comprising a member having an opening formed therein for introducing the gas into the interior of said tubular mass, said member including means for separating said gas into a plurality of radial outwardly directed currents and means for upwardly guiding a lower portion of each of said currents in a direction toward the inner surfaces of the tubular mass; a body situated close to said opening and including means for guiding upwardly an upper portion of each of said currents toward the inner surfaces of the tubular mass at a more acute angle than that at which said lower portion is guided and means constituting a cylindrical surface adjacent to the last-mentioned means; and means for varying the relative positions of said member and said body to vary the size of said opening.

3. In an apparatus for making glass tubes by the drawing of a vitreous mass through an annular orifice, a device for blowing gas into the interior of the drawn tubular vitreous mass, said device comprising an annular member having an opening formed therein for introducing the gas into the interior of said tubular mass, said member including a plurality of rib-like members situated around said opening for separating said gas into a plurality of radial outwardly directed currents and means for guiding a lower portion of each of said currents in a direction toward the inner surfaces of the tubular mass; a cone-like body having an apex situated adjacent to said opening and a base situated away from said opening, said cone-like body including surfaces for guiding an upper portion of each of said currents toward the inner surfaces of the tubular mass at a more acute angle than that at which said lower portion is guided, the base of said cone-like body including an annular flange; and means connecting said cone-like body with said rib-like members for varying the relative positions of said annular member and said cone-like body to vary the size of said opening.

4. In an apparatus for making glass tubes by the drawing of a vitreous mass through an annular orifice, a device for blowing gas into the interior of the drawn tubular vitreous mass, said device comprising an annular member having an opening formed therein for introducing the gas into the interior of said tubular mass, said member including a funnel-like portion and a plurality of rib-like members supported by said funnel-like portion and situated around said opening for separating said gas into a plurality of radial outwardly directed currents, said funnel-like portion having surfaces for guiding a lower portion of each of said currents in a direction toward the inner surfaces of the tubular mass; a cone-like body having an apex situated adjacent to said opening and a base situated away from said opening, said cone-like body including surfaces for guiding an upper portion of each of said currents toward the inner surfaces of the tubular mass at a more acute angle than that at which said lower portion is guided; said rib-like members extending through openings formed in said cone-like body; and means adjustably connecting said cone-like body with said rib-like members for varying the relative positions of said annular member and said cone-like body to vary the size of said opening.

GEORGES PAUL DESPRET.